United States Patent

[11] 3,561,327

[72] Inventor Donald A. Stremple
     Strongsville, Ohio
[21] Appl. No. 831,321
[22] Filed June 9, 1969
[45] Patented Feb. 9, 1971
[73] Assignee Eaton Yale & Towne Inc.
     Cleveland, Ohio
     a corporation of Ohio

[54] FLOW DIVIDER AND FLOW-DIVIDING SYSTEM
     9 Claims, 1 Drawing Fig.
[52] U.S. Cl. .................................................. 91/412,
          60/52; 137/100, 137/111, 137/115
[51] Int. Cl. ....................................................F15b 11/16,
          G05d 11/00
[50] Field of Search .......................................... 91/412;
          60/52S (Inquired); 137/100, 101, 111, 115 (Cards)

[56] References Cited
UNITED STATES PATENTS
3,279,558  10/1966  Allen et al. .................. 60/52SX
3,355,994  12/1967  Malott .......................... 91/412
3,410,295  11/1968  Malott .......................... 60/52SUX Primary Examiner—Edgar W. Geoghegan
Attorney—Teagno & Toddy ABSTRACT: Two-pump flow divider for operating a power steering unit and a second load device on a vehicle, in which excess output from the steering pump is bypassed to a low pressure third outlet that is blocked from the second load device to prevent undesired interaction between the second load device and the power steering unit when the second load device is operated at higher pressure than the power steering unit.

PATENTED FEB 9 1971
3,561,327
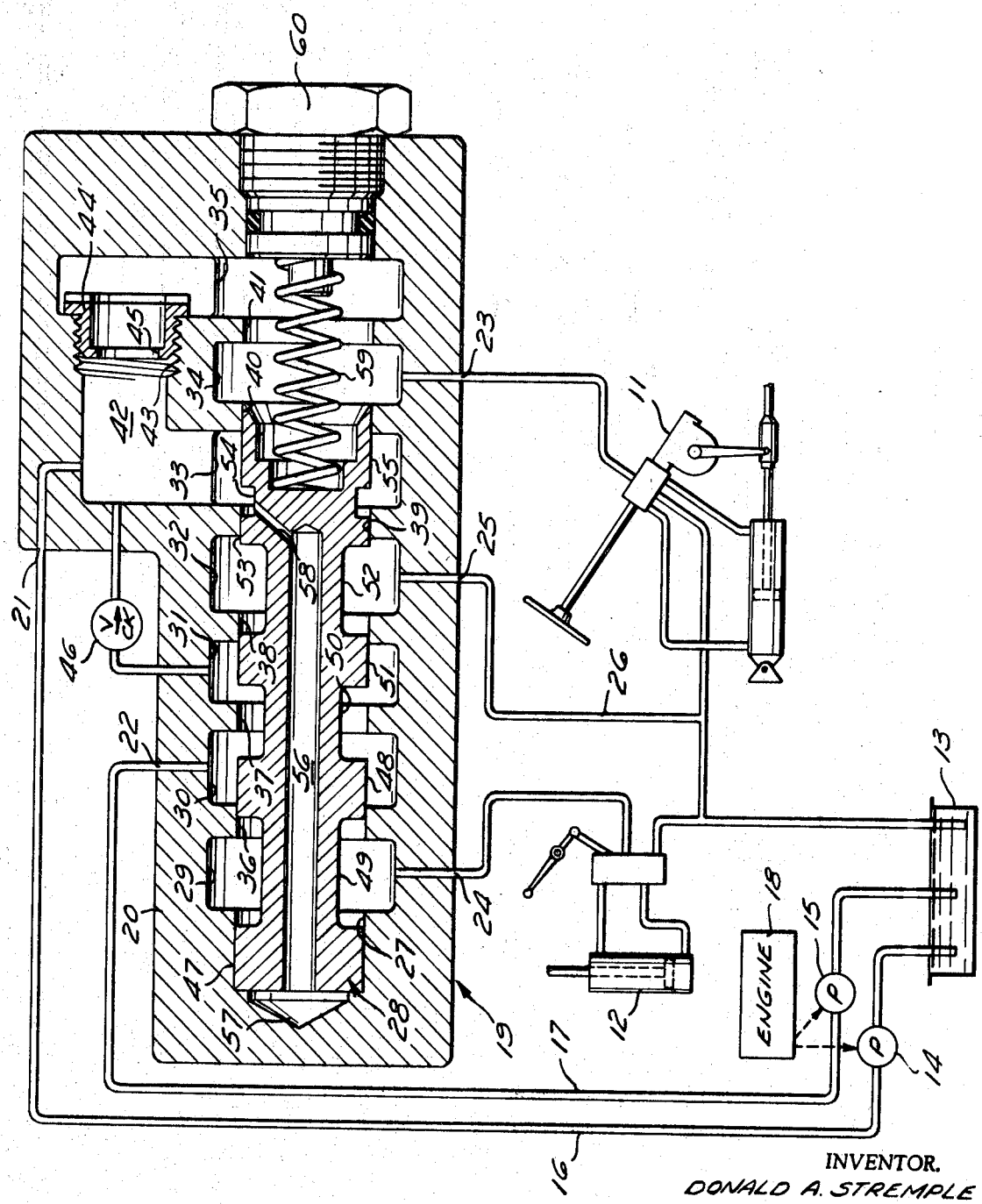
INVENTOR.
DONALD A. STREMPLE
BY
ELY, GOLRICK & FLYNN
ATTORNEYS

FLOW DIVIDER AND FLOW-DIVIDING SYSTEM

This invention relates to a flow divider and to a flow-dividing hydraulic system.

U.S. Letters Pat. No. 3,279,558 to John D. Allen and Ray G. Holt, assigned to the assignee of the present invention discloses a flow divider and flow-dividing hydraulic system particularly intended for use on bulldozers, tractors and other heavy automotive equipment having a power steering unit and at least one other hydraulically operated load device. In the specific system disclosed in that patent, at low engine speeds two engine-driven pumps are connected to the power steering unit to supply its requirements when the output from the steering pump alone would be insufficient. At progressively higher engine speeds, the output from the second pump is progressively disconnected from the power steering unit and is progressively connected to the second load device, while the steering pump is kept connected to the steering unit. At even higher engine speeds, when the output from the steering pump exceeds the requirements of the steering unit, some of the steering pump output is diverted to the second load device.

In certain practical applications the second load device may require a higher operating pressure than the power steering unit, in which case it is undesirable to have the steering pump ever connected to the second load device.

The present invention constitutes a modification and improvement on the arrangement disclosed in U.S. Pat. No. 3,279,558 in that it positively prevents the steering pump from being connected to the second load device, even while diverting excess output of the steering pump away from the steering unit.

Accordingly, it is a principal object of this invention to provide a novel and improved flow divider for use with more than one pressure source and more than one load device, and having a novel arrangement for diverting excess flow away from the priority load device, such as a power steering unit, to prevent the principal pressure source for the priority load device from being connected to another load device which may be operating at a higher pressure than the priority load device.

Another principal object of this invention is to provide a novel and improved hydraulic flow-dividing system having two pressure sources and a priority load device and another load device, with the priority load device receiving pressure fluid from both pressure sources when the output of its principal pressure source is inadequate to supply its requirements, and with the excess flow from this principal source being diverted away from the priority load device but blocked from the other load device when the output of this pressure source exceeds the requirements of the priority load device.

Further objects and advantages of this invention will be apparent from the following detailed description of a presently preferred embodiment which is illustrated schematically in the single FIGURE of the accompanying drawing.

Referring to the drawing, the system embodying the present invention has a first hydraulically operated load device which, in the embodiment shown, is the power steering unit 11 for a vehicle. The system has a second hydraulically operated load device 12, represented by a cylinder-and-piston unit, which may be coupled to a bulldozer blade or other power-operated element on the same vehicle as the steering unit 11. The system also includes a hydraulic fluid reservoir 13 and two separate pumps 14 and 15 arranged to pump fluid from the reservoir through two separate lines 16 and 17. The vehicle has a variable speed engine 18 which drives the two pumps at speeds varying with the engine speed. The system also includes a novel flow divider valve, designated in its entirety by the reference numeral 19, for controlling the fluid flows between the pumps 14, 15 and the load devices 11, 12.

The flow divider comprises a valve body 20 having a first inlet port 21 connected to the outlet of pump 14 and a second inlet port 22 connected to the outlet of pump 15. The valve body has a first outlet port 23 connected to the power steering unit 11, a second outlet port 24 connected to the second load device, and a third outlet port 25 which is here shown as connected to a low pressure return line 26 leading back to reservoir 13. If desired, however, the third outlet port 25 may be connected to a third load device (not shown) which operates at a lower pressure than the steering unit 11.

The valve body 20 has a cylindrical bore 27 which slidably receives a valve spool 28. The valve spool is axially movable to control the fluid flows between the inlet and outlet ports, as explained hereinafter.

The valve body bore 27 is intersected at successive locations spaced apart along its length by annular passages or recesses 29, 30, 31, 32, 33, 34 and 35 (from left to right in the drawing). Passage 29 is connected directly to the second outlet port 24 and is separated from the next passage 30 by a cylindrical land surface 36 of the bore 27 in the valve body. Passage 30 is connected directly to the second inlet port 22 and is separated from the next passage 31 by a cylindrical land surface 37 of the valve body bore. Passage 31 is separated from the next passage 32 by a cylindrical land surface 38 of the valve body bore. Passage 32 is connected directly to the third outlet port 25 and is separated from the next passage 33 by a cylindrical land surface 39 of the bore in the valve body. Passage 33 is connected directly to the first inlet port 21 and is separated from the next passage 34 by a cylindrical land surface 40 of the valve body bore. Passage 34 is connected directly to the first outlet port 23 and is separated from the next passage 35 by a cylindrical land surface 41 of the valve body bore.

Passages 33 and 35 are interconnected by a bypass passage 42 in the valve body which is screw-threaded at 43 to receive an externally threaded orifice ring 44 which presents a flow-restricting orifice 45.

A check valve 46 is connected between passages 31 and 42 in the valve body, permitting flow from passage 31 to passage 42 but not vice versa.

The valve spool has a cylindrical land 47 on its left end which sealingly engages the valve body bore 27 to the left of passage 29.

The valve spool has another cylindrical land 48 for sealing engagement with the land surface 36 or the land surface 37 of the valve bore, depending upon the axial position of the spool. The axial length of the valve spool land 48 is slightly less than the axial separation between the land surfaces 37, 38 of the valve body bore. Between its lands 47 and 48 the valve spool presents an external annular groove 49.

To the right of its land 48 the valve spool has an external annular groove 50, and to the right of that groove it presents a cylindrical land 51 which is sealingly engageable with the land surface 38 of the bore in the valve spool.

To the right of its land 51 the valve spool has an external annular groove 52, and to the right of that groove it presents a cylindrical land 53 which is sealingly engageable with the land surface 39 of the valve body bore.

To the right of its land 53 the valve spool has an external annular groove 54, and to the right of that groove it terminates in a cylindrical land 55 which is sealingly engageable with the land surface 40 of the valve body bore.

The valve body has an internal axial passage 56 which at its left end opens into a recess 57 in the valve body at the end of the latter's bore 27. The right end of passage 56 is connected by a cross passage 58 to the external groove 54 on the valve spool.

A biasing spring 59 is engaged under compression between the right end of the valve spool 28 and a plug 60 which closes the right end of the valve body bore 27 to the right of passage 35.

In the operation of this valve, normally the spring 59 biases the valve spool 28 to the left, as shown in the drawing. In this position of the valve spool it connects the second inlet port 22 to passage 31 leading to passage 42 by way of check valve 46. The valve spool land 48 sealingly engages the land surface 36 on the valve body to block the second inlet port 22 from the second outlet port 24. The valve spool land 51 sealingly engages the land surface 38 on the valve body to block the second inlet port 22 from the third outlet port 25. The valve spool land 53 sealingly engages the land surface 39 on the valve body to block the first inlet port 21 from the third outlet port 25.

The left end of the valve spool 28 is subjected to the fluid pressure at the first inlet 21 by way of the internal passage 56 and the cross passage 58 in the valve spool. The right end of the valve spool is exposed to the fluid pressure at passage 35, at the opposite side of the orifice 45 from the first inlet port 21. This condition prevails in all axial positions of the valve spool, so that it will be subjected at all times to the fluid pressure differential across the orifice 45. The pressure drop across this orifice will produce a differential fluid pressure force acting on the valve spool in opposition to the force exerted by spring 59.

At low engine speeds, the combined outputs of the steering pump 14 and the second pump 15 are sufficiently low that the pressure differential across orifice 45, acting on valve spool 28, will not overcome spring 59. Consequently, the outputs of both pumps will be supplied to the power steering unit 11, which is the priority load device.

At progressively higher engine speeds, the pump outputs will produce an increasing pressure drop across the orifice 45, and the fluid pressure unbalance acting on valve spool 28 will cause it to move progressively to the right in the drawing, against the opposing force exerted by spring 59. As the valve spool moves to the right, its land 48 moves away from the valve body land surface 36 to connect the second inlet 22 to the second outlet, so that some of the output of the second pump 15 will be supplied to the second load device 12, with the remainder passing through check valve 46 and orifice 45 to the steering unit 11. The entire output of the steering pump 14 continues to be applied via orifice 45 to the steering unit.

As the engine speed continues to increase, the further movement of valve spool 28 to the right will cause its land 48 to increase the size of the flow passage through the valve between the second inlet 22 and the second outlet 24 and to decrease the size of the flow passage through the valve from the second inlet 22 to the passage 31 leading via orifice 45 to the first outlet 23. Consequently, the flow from the second pump 15 to the steering unit 11 is progressively restricted while the flow from the second pump 15 to the second load device 12 is progressively increased.

At some point the valve spool 28 will have reached a position in which its land 48 sealingly engages the valve body land 37, thereby completely blocking the second inlet 22 from passage 31 so that now all of the output of the second pump 15 is supplied to the second load device and the sole pressure source for the steering unit 11 is the steering pump 14.

At even higher engine speeds, as the valve spool 28 continues to move to the right, the just-described condition will be maintained and the valve spool land 53 will move away from sealing engagement with the valve body land 39. At this time, some of the output of the steering pump 14 will flow via passages 33 and 32 to the third outlet 25 leading back to the sump 13. This condition occurs when the output of the steering pump alone exceeds the requirements of the power steering unit 11, so that it becomes desirable to divert this excess steering pump output away from the steering unit. At this time, however, the continued sealing engagement of the valve spool land 51 with the valve body land 38 and of the valve spool land 48 with the valve body land 37 maintains the first inlet 21 blocked from the second outlet 24. Consequently, there can be no undesired interaction between the second load device 12 and the steering unit 11, which is particularly to be avoided when the operating pressure at the second load device is higher than the operating pressure at the steering unit.

I claim:

1. In a hydraulic system having first and second pumps, variable speed drive means for said pumps, first and second fluid pressure-operated load devices, said first pump when driven at low speed having an output fluid flow which is insufficient for the operation of said first load device, and valve means connected between both said pumps and both said load devices and operative:

a. at low pump speeds to connect both pumps to said first load device; and
   b. at progressively higher pump speeds to progressively restrict the fluid flow from said second pump to said first load device and provide increasing fluid flow from said second pump to said second load device while maintaining fluid flow from said first pump to said first load device; the improvement wherein said valve means has an outlet separate from said load devices, and said valve means is operative at even higher pump speeds, when said first pump delivers fluid in excess of that required to operate said first load device, to pass the excess flow from said first pump to said last-mentioned outlet.

2. A system according to claim 1, wherein said second load device operates at a higher pressure than said first load device, and said outlet is at lower pressure than said first load device.

3. A system according to claim 2, wherein said first load device is a vehicle power steering apparatus.

4. A system according to claim 1 wherein said valve means comprises means providing a flow-restricting orifice between said first pump and said first load device, and a valve spool connected between said first and second pumps and said first and second load devices and said last-mentioned outlet, spring means biasing said valve spool to a position blocking said first and second pumps from both said second load device and said last-mentioned outlet, and said spool having oppositely facing surfaces thereon which are exposed respectively to the fluid pressures at the opposite sides of said orifice to provide a fluid pressure unbalance acting on the spool in opposition to said spring means in response to the fluid flow through said orifice to said first load device.

5. A system according to claim 4, wherein said second load device operates at a higher pressure than said first load device, and said outlet is at lower pressure than said first load device.

6. A system according to claim 5, wherein said valve means has a check valve having its outlet connected to the inlet side of said orifice, said spool when biased to said position by said spring means connects said second pump to the inlet side of said check valve, and said spool when it moves away from said position progressively blocking said second pump from the inlet side of said check valve.

7. A control valve for controlling the division of flow between two pressure sources and three outputs, said valve comprising a valve body having a first inlet for connection to a first pressure source, a second inlet for connection to a second pressure source and spaced from said first inlet, a first outlet for connection to a first load device, a second outlet for connection to a second load device and spaced from said first inlet, and a third outlet spaced from said first and second outlets, movable pressure-responsive valve means in said valve body controlling the fluid flows between said inlets and outlets, spring means biasing said valve means to a position connecting both said first and second inlets to said first outlet and blocking said second inlet from said second outlet and blocking both said first and second inlets from said third outlet, said movable valve means being operative in response to the fluid flow to said first outlet:

a. at low flow rates to the first outlet, to maintain both said first and second inlets connected to said first outlet;
   b. at progressively higher flow rates to the first outlet, to progressively restrict the flow from said second inlet to said first outlet and provide increasing flow from said second inlet to said second outlet, while maintaining said first inlet connected to said first outlet and maintaining both inlets blocked from said third outlet; and
   at even higher flow rates to the first outlet, to pass excess flow from said first inlet to said third outlet while maintaining said second inlet blocked from both said first and third outlets.

8. A control valve according to claim 7, and further comprising means providing a flow-restricting orifice between said first inlet and said first outlet, and wherein said movable valve means is a valve spool slidably disposed between said inlets and outlets and having oppositely facing surfaces thereon which are exposed respectively to the fluid pressures at the opposite sides of said orifice to provide a fluid pressure unbalance acting on the spool in opposition to said spring means in response to the fluid flow through said orifice to said first outlet.

9. A control valve according to claim 8, and further comprising a check valve having its outlet connected to the inlet side of said orifice, and wherein said valve spool when biased to said first-mentioned position by said spring means connects said second inlet to the inlet side of said check valve, and said valve spool in response to increasing flow through said orifice progressively restricts the fluid path between said second inlet and the inlet side of said check valve.